Nov. 28, 1967   V. O. TALBERT   3,355,043
TRUCK AND BODY CONNECTION MEANS
Filed Oct. 20, 1965   2 Sheets-Sheet 2
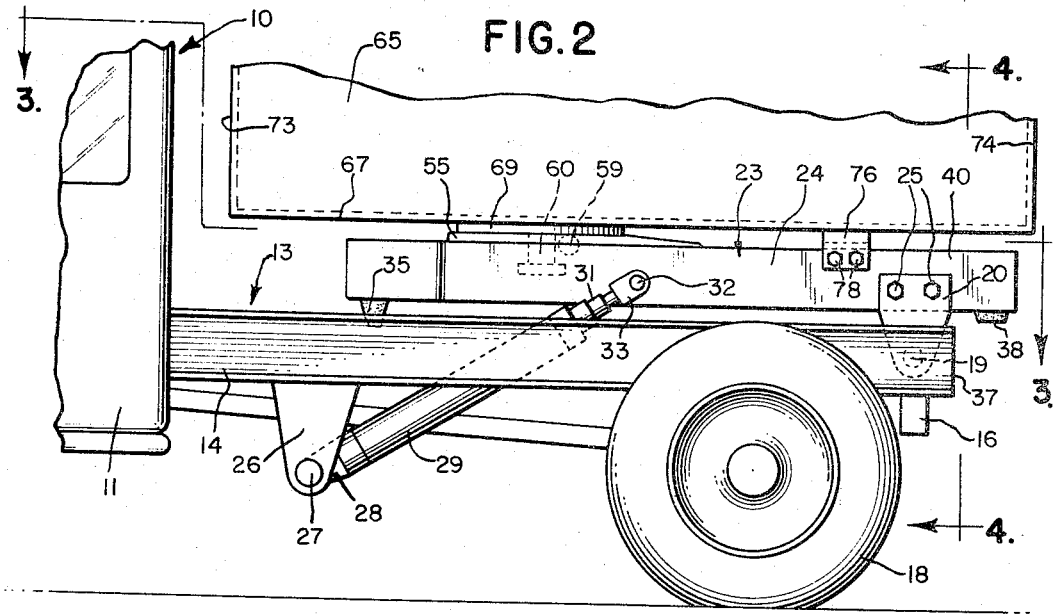
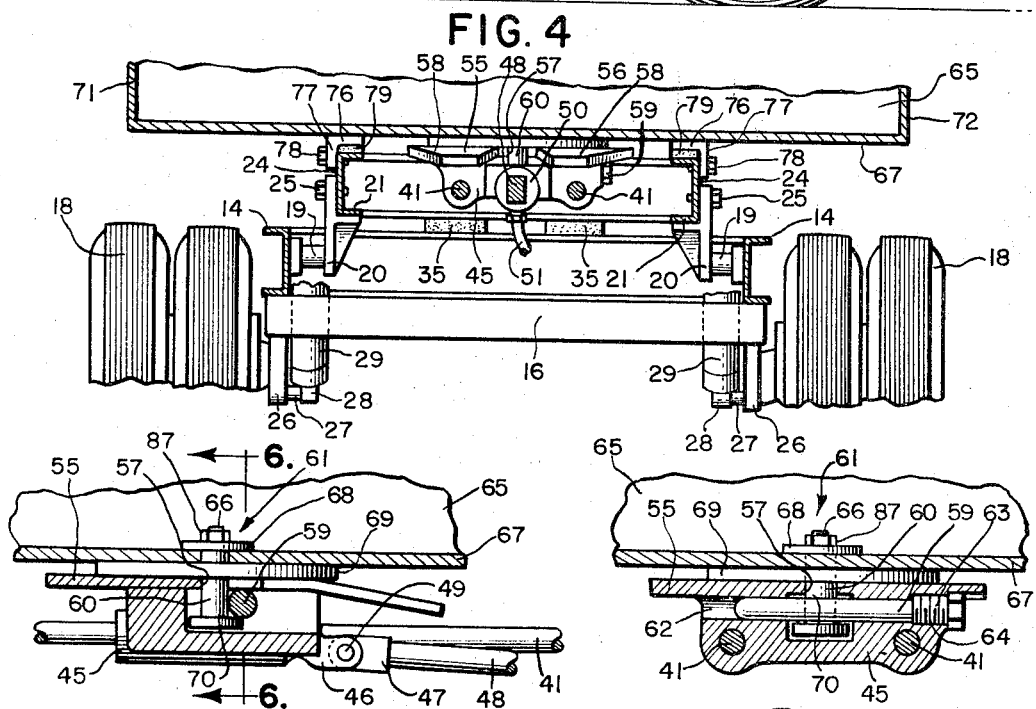
INVENTOR.
Virgil O. Talbert
BY
Attorney United States Patent Office 3,355,043
Patented Nov. 28, 1967

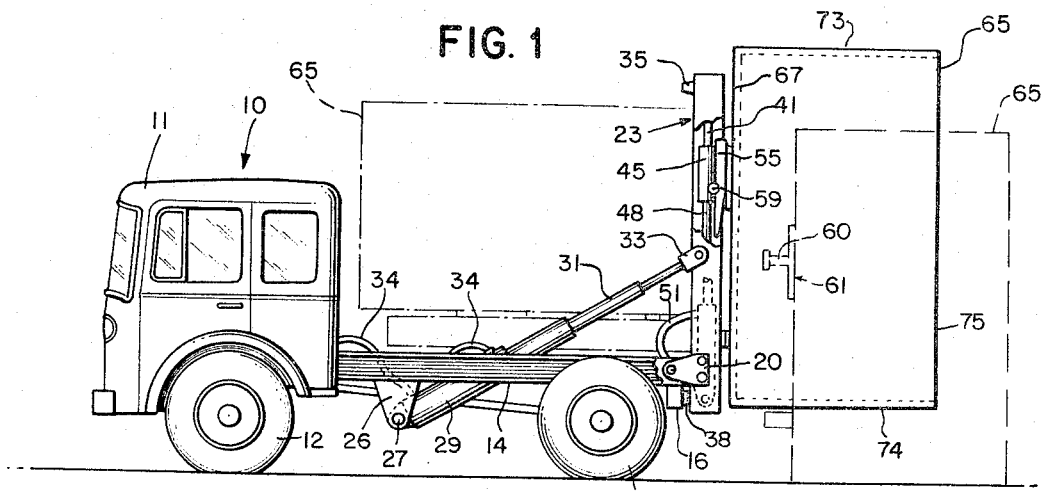

3,355,043
TRUCK AND BODY CONNECTION MEANS
Virgil O. Talbert, Wilmette, Ill., assignor to International Harvester Company, a corporation of Delaware
Filed Oct. 20, 1965, Ser. No. 498,560
2 Claims. (Cl. 214—501)

ABSTRACT OF THE DISCLOSURE

A mounting apparatus for connecting either a semi-trailer or integral-type wagon body to a truck tractor. A fifth wheel is arranged on a frame that is pivotable at one end about a transverse axis to thus permit elevation of the fifth wheel. The position of the fifth wheel is adjustable with respect to the frame and facilitates the connection and disconnection of containers. There is a positive connection between the trailer or other container and the fifth wheel.

The present invention relates to a truck with a detachable body. Particularly, the invention relates to a towing truck and the like and thereby carried connection means for electively mounting or hauling a semi-trailer or integral type or wagon body. Specifically, the invention relates to a truck tractor and the like having a fifth wheel mechanism by means of which a semi-trailer or an integral type wagon body may be connected to the truck tractor.

Trucks of the general class with which the instant invention concerns itself primarily are intended solely for hauling of load carrying semi-trailers and are not directly useable for other purposes. It is a primary object of the present invention to increase the usefulness of such hauling trucks by equipping them to serve for other work in addition to merely towing of semi-trailers.

It is a further object of the present invention to adapt a truck tractor which can be engaged in hauling a semi-trailer to carry an integral type or wagon body.

Another object of the present invention is the provision of means whereby a fifth wheel construction of a truck tractor may be utilized for interchangeably holding a load carrying body of either the integral wagon or semi-trailer type in doing hauling.

An additional object of the present invention is the provision of a tractor of the automotive type combined with a novel hitching mechanism for removably mounting an integral type truck body on the tractor.

A still further object of the present invention is the provision of an automotive tractor with a fifth wheel platform adapted for connecting said tractor to a semi-trailer and having means for rocking the fifth wheel into a substantially vertical plane when not connected to a semi-trailer for connection to a truck or wagon body of the integral type and lifting said body from a position adjacent said tractor into load carrying position on the framework thereof.

The foregoing and other objects, features and advantages of the present invention will become more apparent upon consideration of the following description and appended claims, when considered in conjunction with the accompanying drawings wherein the same reference character or numeral refers to like or corresponding parts through the several views.

On the drawings:

FIG. 1 is a side elevational view of an automotive tractor embodying one form of the present invention and showing a wagon body of the integral type connected to the fifth wheel, alternate positions of said wagon body being shown in phantom and parts being broken away for the purpose of illustration.

FIG. 2 is an enlarged side elevational view showing a portion of the tractor with the wagon body conditioned for hauling.

FIG. 3 is a view taken on a composite plane designated by the line 3—3 of FIG. 2 and showing the invention in plan.

FIG. 4 is a transverse sectional view in a vertical plane taken substantially on the line 4—4 of FIG. 2 and looking in the direction of the arrows.

FIG. 5 is a vertical sectional view taken substantially on the line 5—5 of FIG. 3 and looking in the direction of the arrows.

FIG. 6 is a sectional view on a vertical plane normal to the plane of FIG. 5 taken substantially on line 6—6 of FIG. 5 and looking in the direction of the arrows.

Referring now more particularly to the drawings, an automotive truck tractor or towing truck generally designated 10 is provided. As is customary, the tractor 10 may include a cab 11 mounted on the forward end of the tractor over a pair of laterally spaced apart forward wheels 12. Cab 11 is carried on the front end of a chassis generally designated 13, and which, as illustrated in FIG. 3, is characterized by a pair of laterally spaced apart side rails 14, 14 which are projected rearwardly from said cab. Said rails together with a forward transversely extending cross rail 15 the opposite ends of which are secured to side rails 14, 14 and a transversely extending rear cross piece 16 the opposite ends of which are also connected to the rails 14, 14 at the aft end thereof, form a rectangular chassis framework which is supported over the rear axle assembly 17 between two pairs of rear tractor wheels 18, 18.

Extending inwardly from the rear end portions of the rails 14, 14 are a pair of trunnions 19, 19 which provide the axis of rotation for a pair of support brackets 20, 20, one end portion of each of which is mounted on a corresponding trunnion. The opposite end portions of each of said brackets provides a right angular seat 21, as illustrated in FIG. 4. A rockable fifth wheel mount generally designated 23 and comprising a carrier frame has a pair of opposite parallel laterally spaced elongated sides or legs 24, 24 which are disposed inwardly from the rail 14, 14 though extending longitudinally thereof and parallel thereto. Said sides or legs 24, 24 in the instant embodiment may be right angular in configuration whereby an aft end portion of each thereof can be accommodated in a corresponding right angular seat 21. With the sides 24, 24 mounted in such position, the brackets 20, 20 are secured to said sides, respectively, by means of simple fasteners 25 such as screws or the like. Accordingly, the fifth wheel mount 23 is adapted for rocking about the axis provided by the trunnions 19, 19.

As illustrated in FIGS. 1 and 2, to rock the mount 23 each of the rails 14, 14 has depending from the front end portion thereof a rigid arm or bracket 26 from which there extends inwardly a pivot pin 27. An apertured hydraulic cylinder mount or connector 28 which is rockably mounted on each of said pins 27 anchors the forward end portion of a corresponding hydraulic cylinder 29 to each of said rails 14, 14. Lateral movement or displacement of said connectors 28, 28 axially of pins 27, 27 being limited by the rails 14, 14 and enlarged pin heads 30, 30 as illustrated in FIG. 3.

The hydraulic cylinders 29, 29 are disposed in substantially parallel relationship and are double acting to the end that the fifth wheel mount will be uniformly managed as it is rocked between its extreme attitudes shown in phantom and in solid line in FIG. 1. For conditioning the mount 23 the motivating arms 31, 31 of said cylinders 29, 29 are projectable upwardly and rearwardly, said arms being pivotally connected as at 32, 32 by means of conventional connectors 33, 33 to medial portions of the side or legs 24, 24 respectively, as illustrated in FIGS. 1, 2 and 3.

Hydraulic fluid circulating lines 34 which are in evidence only in FIG. 1 provide the means for controlling the flow of fluid in the hydraulic cylinders 29, 29. To permit the use of shortened cylinders, 29, 29 with motivating arms 31, 31 capable of being projected a distance farther than the length of said cylinders, the arms may comprise a plurality of telescopically connected together sections operable in a manner readily understood in the art.

When mount motivating arms 31, 31 are withdrawn to the position illustrated in FIG. 2, the mount 23 will be disposed in a substantially horizontal plane, then being supported at its aft end portion by brackets 20, 20 and held at its forward end portion by means of a pair of bumpers 35, 35. Said bumpers may be of elastomer fabrication and suitably connected to or retained on aft transversely extending integral frame component 36 of the fifth wheel mount 23 in transversely spaced disposition, as illustrated in FIG. 1, so that when the mount 23 is conditioned horizontally as illustrated in FIGS. 2 and 3 the bumpers 35, 35 will engage and seats 85, 85 which may be fashioned on the chassis frame member 15, as illustrated in FIG. 3. The height of the bumpers 35, 35 is such that, when the fifth wheel mount 23 is thereby supported, it will be disposed in a plane substantially parallel to the plane of the rails 14, 14.

To the end that the fifth wheel mount 23 is rockable over the chassis rear cross piece 16 between rails 14, 14, the trunnions 19, 19 are appropriately disposed relative to said chassis frame rear end 37 and the brackets 20, 20 are of suitable length. To assist in limiting the rocking angle of the fifth wheel mount 23 about the chassis frame end 37, the chassis rear cross piece 16 depends from the rails 14, 14 and is disposed for alignment with elastomer bumper means 38 which may be carried by the rear or aft integral frame member 39 of said fifth wheel mount 23. The mount frame member 39, as illustrated in FIG. 3, extends transversely of the mount sides 24, 24, the opposite ends of said frame member 39 being respectively connected to end portions 40, 40 of said mount sides which extend beyond the aft end of the chassis 13, as illustrated clearly in FIGS. 2 and 3. The thickness of bumper means 38 is such that when engaged with the rear chassis cross piece 16, as illustrated in solid lines in FIG. 1, the fifth wheel mount 23 will be disposed substantially in a vertical plane.

A pair of elongated straight rails 41, 41 defining a track which is generally designated as 42 are mounted in parallel relationship between the fifth wheel mount sides or legs 24, 24 longitudinally of which said rails 41, 41 extend, as illustrated in FIG. 3. One end portion of each of the rails 41, 41 is mounted on or connected to the aft frame component 36 of fifth wheel mount 23 in spaced apart relationship from the other thereof. Such connection may be achieved by means of a pair of sockets 43, 43 attached on the mount member 36 in which sockets said rails are retained, as illustrated in FIG. 3. Securance of the rail 41, 41 may be completed by fasteners such as screws or the like 44, 44 which tie the opposite ends of the rails 41, 41 to the fifth wheel mount frame member 39.

A fifth wheel carriage 45, as illustrated in FIGS. 1, 4, 5 and 6 and in dotted lines in FIG. 3, is mounted on the rails 41, 41 for slidable movement longitudinally thereof between the fifth wheel mount frame component 36 and member 39. To motivate the carriage 45, it has a pair of opposite integral short arms 46, 46 forming a boss which projects towards the fifth wheel mount frame member 39. The link end 47 of an hydraulically extendable rod 48 is pivotally mounted between the arms 46, 46, as illustrated at 49 in FIGS. 2 and 5. The rod 48 is the reciprocative component of an hydraulic mechanism characterized by what may be a double acting hydraulic cylinder 50 having hydraulic fluid lines 51 through which flow may be controlled by conventional means well known in the art. As illustrated in FIG. 3, one end portion of the cylinder 50 has an apertured anchoring part 52 which is pivotally mounted on a pin or the like 53 between a pair of short arms 54, 54 comprising a boss which may be fashioned integrally with fifth wheel mount frame member 39. Through appropriate operator management of means (not shown) which may be worked from cab 11, hydraulic fluid in the lines 51 may be reversibly directed through the hydraulic cylinder 50 whereby the rod 48 may be motivated to slide the carriage 45 longitudinally of track 42.

The carriage 45 supports a fifth wheel platform or plate 55 which is secured to said carriage by any suitable means which will constrain for movement therewith said fifth wheel platform. The platform 55 has a longitudinal slot 56 with a central socket 57 arranged in the usual manner, as shown in FIGS. 3, 4, 5 and 6. Normally rear portion of the platform is formed with a pair of diverging shoes 58, 58 which define the longitudinal slot 56.

Latch-like means 59 which may be of any conventional construction are employed on the normally underside of the platform 55 for the purpose of releaseably retaining the king pin 60 of a coupling assembly generally designated 61 in said socket 57, as illustrated in FIGS. 4-6, inclusive. In the present embodiment latch-type means 59 comprises a pin which is transversely slidable in an elongated bore 62 provided in the carriage 45 immediately adjacent the fifth wheel platform 55. The pin comprising the latch-like means may have a threaded portion 63 screwable in the counter-sunk internal threaded well 64 which is disposed at one end of and coextensive with the bore 62. Thereby, the latch-like means 59 may be releaseably retained to releaseably secure king pin 60 as aforesaid.

The coupling assembly 61 may provide the means for releaseable connection of a semi-trailer (not shown) to the tractor 10 through the fifth wheel platform 55 in a conventional manner. Or, as illustrated in the instant drawings, it may be employed for coupling a wagon or integral type truck body 65 to the tractor 10. In such latter event, the king pin 60 may have an inner end portion 66 which is suitably secured to the floor 67 of the wagon body 65 by any suitable means. In the instant embodiment, the end portion 66 is threaded and has thereon mounted a nut 87 which serves as a fastener, said nut being threaded against a washer or the like 68 which is disposed against the inner surface of the floor 67 about a floor aperture through which the king pin 60 extends, as illustrated in FIGS. 5 and 6. An anti-friction member or bearing flange 69 is rigidly secured to the under surface of the body floor 67 and has projected therethrough the outer end portion 70 of the king pin 60. The outer end portion 70 is adapted to be seated or engaged in the socket 57 formed in the fifth wheel platform 55, with said platform in abutment with said bearing flange 69.

In FIG. 1 there are illustrated alternate positions of the wagon or integral type truck body 65. Two of the conditions for said body 65 are illustrated in phantom, while a third is shown in solid lines. The invention may be employed for mounting and unloading the wagon body 65. As illustrated, said wagon body may have integral with the floor 67 a pair of side walls 71 and 72, normally front and rear panels 73 and 74, respectively, and a top panel 75.

When the wagon body 65 is not in hauling position it can be stored by standing it on its normally rear panel 74, as illustrated in phantom to the right of FIG. 1. Such conditioning positions the wagon body floor 67 in a vertical plane. By also conditioning the fifth wheel mount 23 so that it is disposed in a vertical plane, that is, by extending the hydraulically actuated arms 31, 31 to the position shown in FIG. 1, the fifth wheel platform 55 can be made to assume an aspect in a vertical plane which is parallel to the then vertical wagon body floor 67. By extending the hydraulically actuated rod 48 to position the fifth wheel platform 55 adjacent the mount frame component 36 while the fifth wheel mount 23 is vertically conditioned, the fifth wheel platform 55 can be disposed above the coupling assembly 61. It is appreciated that the coupling assembly 61 is intentionally mounted at a level on the floor 67 which will enable said coupling assembly to be disposed below the fifth wheel platform 55 when the wagon body is stood on end on the ground adjacent the tractor 10. Thereupon, should tractor 10 be backed toward the floor 67, the slot 56 will be brought into alignment with the king pin 60, whereupon withdrawal or contraction of the then extended rod 48, the fifth wheel platform will be lowered into coupling condition about the king pin for engagement thereof in the socket 57. Thereafter, the latch-like means 59 may be secured in coupling position. Then, upon extending the hydraulically actuated rod 48, the wagon body 65 will be elevated to the level shown in solid lines in FIG. 1. Thereafter, upon withdrawal or retraction of the telescopic arms 31, 31, the fifth wheel mount 23 can be rocked to horizontal or hauling position, as illustrated in phantom towards the center of FIG. 1. To uncouple the wagon body 65, the coupling procedure, heretofore described, can be reversed.

To preclude shifting of the wagon body relative to the fifth wheel platform 55 a pair of right angular brackets 76, 76, as illustrated in FIGS. 2 and 4, may be connected to the floor 67 or secured on opposite sides of said body in a manner such that a pair of bracket flanges or extensions 77, 77 are adapted to be secured to the mount sides 24, 24, respectively, by means of fasteners such as screws or the like 78. Inasmuch as the brackets 76, 76 shown are disposed toward the normally aft end portion of the floor 67 and the coupling assembly 61 is disposed toward the opposite end portion of said floor, the body 65 will be restrained from undesirable shifting when coupled to the tractor 10. If desired suitable bumper or padding means 79, as illustrated in FIG. 4, may be provided as a cushion between the brackets 76, 76 and the sides 24, 24 of the fifth wheel mount 23 on which said brackets will seat to support the body 65 with its floor 76 spaced slightly from said sides by said padding means, as illustrated clearly in FIG. 4.

In accordance with the foregoing, it is appreciated that an automotive towing truck for truck tractors adapted for hauling semi-trailers can have its usefulness increased by conditioning or equipping it to serve for carrying integral type truck or wagon bodies. Furthermore, it is appreciated that such conditioning permits an automotive truck tractor to be alternately employed as a carrier either for a semi-trailer or an integral type truck or wagon body. In addition to the foregoing, it is appreciated that by providing appropriate closure means (not shown) in the end wall or panel 73, the truck body 65 may be loaded and unloaded when it is uncoupled from the tractor 10 and disposed, for example, as illustrated in phantom to the right of FIG. 1.

Moreover, attention is invited to the characteristics of the invention which enables employment of the body 65 as a dump truck. It is appreciated that by suitable closure means in the end panel 74 and the details of which are not shown as they are not intended as limitations on the present invention, dumpable or pourable materials may be unloaded from the body 65 when it is mounted, as illustrated in FIG. 2 by rocking it about an axis defined by the trunnions 19, 19, the mount 23 being adapted for dump type rocking action by reason of its control of body 65 through hydraulically actuatable arms 31, 31.

As many substitutions or changes could be made in the above described construction, and as many apparently widely different embodiments of the invention within the scope of the claims could be constructed without departing from the scope and spirit thereof, it is intended that all matter contained in the accompanying specification shall be interpreted as being illustrative and not in a limiting sense.

What is claimed is:

1. An automotive tractor including a rear end portion having a fifth wheel type coupling member and a load hauling body, a fifth wheel mount connected to and rockable over a rear end portion of said tractor, mount control means for positioning said fifth wheel mount vertically and horizontally, guide means providing a fifth wheel track on said fifth wheel mount and disposed longitudinally thereof, said load hauling body having a king pin depending therefrom, latch means carried by said coupling member for effecting a positive connection between said king pin and said coupling member, fifth wheel motivating means for selective positioning of said coupling member longitudinally of said track, whereby said coupling member can be disposed at varying heights in a vertical plane to elevate a load hauling body adjacent said tractor and rock such body into load hauling position on said tractor as said fifth wheel mount is positioned horizontally.

2. An automotive tractor having an elongated chassis frame and a load hauling body, a coupling assembly comprising a fifth wheel mount having front and rear ends extending longitudinally of said frame and swingably mounted thereon about a transverse axis; control means for positioning said mount vertically rearwardly of said frame and horizontally in load hauling attitude on said frame; fifth wheel guide means defining a track extending longitudinally of said mount; a fifth wheel having a supporting flat disposed substantially parallel to said mount and movable along said track toward and away from opposite front and rear ends of said mount; a retractable extension means for moving said fifth wheel longitudinally of said track for adjustment longitudinally thereof; said load hauling body having a king pin depending therefrom; latch means carried by said fifth wheel for effecting a positive connection between said king pin and said fifth wheel.

References Cited

UNITED STATES PATENTS

| | | | |
|---|---|---|---|
| 2,606,676 | 8/1952 | Dempster | 214—515 |
| 2,707,654 | 5/1955 | Williamsen. | |
| 2,807,477 | 9/1957 | Tuso | 280—407 |
| 3,030,125 | 4/1962 | Braunberger | 280—407 |
| 3,155,248 | 11/1964 | Haller | 214—501 |
| 3,181,761 | 5/1965 | Bartlett | 280—425 |

GERALD M. FORLENZA, Primary Examiner.

ALBERT J. MAKAY, Examiner.